(12) United States Patent
Yamaya

(10) Patent No.: US 9,612,640 B2
(45) Date of Patent: *Apr. 4, 2017

(54) HOST DEVICE AND TERMINAL DEVICE, AND COMMUNICATION SYSTEM

(71) Applicant: Renesas Electronics Corporation, Tokyo (JP)

(72) Inventor: Jun Yamaya, Kanagawa (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/953,376

(22) Filed: Nov. 29, 2015

(65) Prior Publication Data

US 2016/0077564 A1 Mar. 17, 2016

Related U.S. Application Data

(63) Continuation of application No. 13/549,484, filed on Jul. 15, 2012, now Pat. No. 9,229,512.

(30) Foreign Application Priority Data

Jul. 15, 2011 (JP) .................................. 2011-156311

(51) Int. Cl.
*G06F 1/26* (2006.01)
(52) U.S. Cl.
CPC .................................... *G06F 1/266* (2013.01)
(58) Field of Classification Search
CPC ..................................................... G06F 1/266
See application file for complete search history.

(56) References Cited

U.S. PATENT DOCUMENTS

| 7,124,307 B2 | 10/2006 | Sugita et al. |
| 7,474,276 B2 | 1/2009 | Endo et al. |
| (Continued) | | |

FOREIGN PATENT DOCUMENTS

| JP | 2003-263373 A | 9/2003 |
| JP | 2007-102444 A | 4/2007 |
| (Continued) | | |

OTHER PUBLICATIONS

Office Action for related Japanese Application No. 2011-156311, mailed Feb. 24, 2015.

*Primary Examiner* — Kim Huynh
*Assistant Examiner* — Joshua Neveln
(74) *Attorney, Agent, or Firm* — Shapiro, Gabor and Rosenberger, PLLC

(57) ABSTRACT

A host-side control unit 120 receives a terminal-device-side notification value INFD indicating a second voltage V2 that is a voltage at a reference point P2 on a terminal-device-side power supply line 134 from a terminal device 130, calculates a first resistance value R1 indicating a resistance from a power supply unit 112 to the reference point P2 based on the terminal-device-side notification value INFD, a first voltage V1 output by the power supply unit 112, and a first current A1 measured by a first current measurement unit 116, and supplies the calculated first resistance value R1 to the power supply unit 112. The power supply unit 112 adjusts the first voltage V1 according to the first resistance value R1 and the first current value A1 measured by the first current measurement unit 116 at that moment so that the second voltage V2 falls within a predetermined first reference range.

13 Claims, 10 Drawing Sheets

(56) References Cited

U.S. PATENT DOCUMENTS

| | | |
|---|---|---|
| 7,814,346 B2 | 10/2010 | Diab |
| 2008/0276104 A1 | 11/2008 | Hussain et al. |
| 2010/0281284 A1 | 11/2010 | Kasprzak et al. |
| 2011/0221604 A1 | 9/2011 | Johnson |

FOREIGN PATENT DOCUMENTS

| | | |
|---|---|---|
| JP | 2002-041188 A | 2/2008 |
| JP | 2008-134794 A | 6/2008 |
| JP | 2008-305148 A | 12/2008 |

HOST DEVICE AND TERMINAL DEVICE, AND COMMUNICATION SYSTEM

CROSS-REFERENCE TO RELATED APPLICATIONS

This application is based upon and claims the benefit of priority from Japanese patent application No. 2011-156311, filed on Jul. 15, 2011, the disclosure of which is incorporated herein in its entirety by reference.

BACKGROUND

The present invention relates to a power supply, in particular to a technique for supplying electric power from a host device to a terminal device.

It has been known that there are systems including a host device (hereinafter it is also simply called "host") and a terminal device(s) in which electric power is supplied from the host device to the terminal device. For example, in USB (Universal Serial Bus) systems, the host device supplies a DC current from a power supply embedded in an interface to a terminal device through an interface cable (USB cable). In this way, the terminal device can operate without using an AC adapter or the like.

The power supply from the host device to the terminal device in the USB system is explained hereinafter with reference to FIG. 10. As shown in FIG. 10, the USB system 10 includes a host device 20, a terminal device 30, and a USB cable 40 connecting the host device 20 with the terminal device 30. The host device 20 includes a power supply unit 22, a host controller 24, and a connector 26, and the terminal device 30 includes a terminal-device controller 34 and a connector 36.

The power supply unit 22 outputs a voltage to be supplied to the terminal device 30. Hereinafter, the voltage output from the power supply unit 22, i.e., the voltage at a point P1 located at the exit of the power supply unit 22 is referred to as "first voltage V1".

In the USB standards, a power supply line used to supply electric power from a host to a terminal device is called "VBUS". For the sake of explanation, the part of the VBUS located on the host side and that located on the terminal-device side are called "host-side VBUS" and "terminal-device-side VBUS" respectively. Further, the part of VBUS located inside the cable is called simply "VBUS".

As shown in the figure, the power supply unit 22 in the host device 20 applies a first voltage V1 to the host-side VBUS 28.

One end of the host-side VBUS 28 is connected to the power supply unit 22 and the other end is connected to the connector 26. A first end of the connector 26 is connected to the terminal-device-side VBUS 28 and a second end of the connector 26 is connected to a VBUS 42 included in the USB cable 40.

The host controller 24 can control the power supply unit 22 and performs various communications with the terminal-device controller 34 of the terminal device 30 through the USB cable 40. Further, the host controller 24 converts various data to be transmitted to the terminal device 30 into packets and converts packets of various data received from the terminal device 30 into the original date format.

Note that in FIG. 10, only the VBUS 42 of the USB cable 40 is shown and the illustration of other signal lines and the like used for the communication between the host device 20 and the terminal device 30 are omitted.

In the terminal device 30, a first end of the connector 36 is connected to the USB cable 40 and a second end of the connector 36 is connected to the terminal-device-side VBUS 38.

The terminal-device-side VBUS 38 is connected to the connector 36 and thereby supplies electric power into the terminal device 30.

The terminal-device controller 34 performs various controls within the terminal device 30 and performs various communications with the host controller 24 of the host device 20 through the USB cable 40. Further, the host controller 24 converts various data to be transmitted to the host device 20 into packets and converts packets of various data received from the host device 20 into the original date format.

Electric power is supplied from the power supply unit 22 to the terminal device 30 through the host-side VBUS 28, the VBUS 42, and the terminal-device-side VBUS 38.

In the USB standards, a power supply voltage and its permissible deviation as well as the maximum value of a current flowing between the host device 20 and the terminal device 30 are specified. For example, the USB 2.0 standards specify that a voltage at a point immediately in front of the connector 26 (point P3) should be within a range from 4.75 v to 5.25 v. The voltage at the point P3 is hereinafter called "third voltage V3".

In general, terminal devices are developed so that they operate properly under the condition that the third voltage V3 is within the above-described range, and the sum total of the contact resistance between the connector 26 and the host-side VBUS 28, the resistance of the VBUS 42, the contact resistance between the VBUS 42 and the connector 36, and the contact resistance between the connector 36 and the terminal-device-side VBUS 38 is equal to or smaller than the maximum value that is expected under normal circumstances. Therefore, terminal devices under development are evaluated whether they operate properly under the condition that a voltage that is obtained by measuring a voltage at a predetermined reference point on the terminal-device-side VBUS 38 (point P2 in the figure) is within a range between a value that is obtained by subtracting a margin according to the normally-expected, maximum value of the above-described sum total of the resistances (i.e., resistances from the point P1 to the reference point P2) from the maximum value of the permissible range of the above-described third voltage V3 (4.74 v to 5.25.v) and a value that is obtained by adding a margin according to the normally-expected minimum value of the above-described sum total of the resistances (e.g., 0) to the minimum value of the permissible range of the above-described third voltage V3. The voltage at the point P2 is hereinafter called "second voltage V2". Further, a range obtained by adding and subtracting a margin to and from the permissible range of the third voltage V3 is called "first reference range" and the permissible range of the third voltage V3 is called "second reference range".

That is, terminal devices are developed so that they operate properly when the voltage at the reference point P2 on the terminal-device-side VBUS 38 is within the first reference range.

SUMMARY

Incidentally, in the actual use, there is a possibility that the voltage at the reference point P2 on the terminal-device-side VBUS 38 is deviated from the first reference range due to some reason such as when the USB cable 40 is too long or when the contact resistance between the connector and the power supply line is too large, and that as a result the terminal device 30 cannot operate properly.

In particular, in the USB 3.0 standards, since the maximum permissible current value for each downstream port has been raised from the conventional 0.5 A to 0.9 A, there is a possibility the power supply to the terminal device become insufficient and thus the terminal device cannot operate properly even when the resistance from the point P1 on the host-side VBUS 28 to the reference point P2 is larger than the expected maximum value by only a small margin.

Japanese Unexamined Patent Application Publication No. 2008-305148 discloses a technique to prevent power supply to a terminal device from becoming insufficient in a USB system. In this technique, a USB power supply booster(s) is inserted at an arbitrary point(s) in the USB cable connecting the host with the terminal device. The USB power supply booster operates by a power supply voltage supplied from the host through the USB cable, raises the power supply voltage to be output to the terminal device to a predetermined voltage threshold, and outputs the raised power supply voltage to the terminal device through the USB cable.

Referring to FIG. 10, the power supply booster in the technique disclosed in Japanese Unexamined Patent Application Publication No. 2008-305148 is disposed on the VBUS 42. That is, this technique raises the voltage at a point on the VBUS 42 to the voltage threshold.

However, if the resistance from the point at which the power supply booster is disposed to the reference point P2 increases due td some reason such as when the cable is changed to a cable having a large resistance, there is still a possibility that the voltage at the reference point P2 becomes lower than the first reference range even when the voltage at the point at which the power supply booster disposed is raised to the voltage threshold. Therefore, the above-described problem is not solved.

Meanwhile, Japanese Unexamined Patent Application Publication No. 2008-134794 discloses a system in which a host obtains a value indicating the driving voltage of a terminal device by communicating with the terminal device and supplies a power supply voltage conforming to that value.

This system outputs driving voltages to various terminal devices that are connected to the host and are operated by different driving voltages. For example, when the host receives information indicating "3 v" from a terminal device whose driving voltage is 3 v, the host outputs a driving voltage of 3 v to that terminal device. Further, when the host receives information indicating "5 v" from a terminal device whose driving voltage is 5 v, the host outputs a driving voltage of 5 v to that terminal device. Japanese Unexamined Patent Application Publication No. 2008-134794 does not disclose or suggest any case where the terminal device cannot operate properly because the power supply voltage output by the host is lowered due to the resistance between the host and the terminal device and thus the lowered voltage is supplied to the terminal device. For example, even when the cable connecting the host with a terminal device whose driving voltage is 5 v is changed from the ordinary cable to a cable having a large resistance, the host continues to output the power supply voltage of 5 v. As a result, there is a possibility that the power supply to the terminal device become insufficient and thus the terminal device cannot operate properly.

The present invention has been made in view of the above-described circumstances, and provides, in a communication system in which electric power is supplied form a host device to a terminal device(s), a technique to reliably supply a power supply voltage having such a range that the terminal device(s) can operate properly.

An aspect of the present invention is a communication system. The communication system includes a host device, and a terminal device connected to the host device through a cable including a power supply line, the terminal device being supplied with electric power from the host device.

The host device includes a host-side connector, a power supply unit, a host-side power supply line, and a first current measurement unit.

A first end of the host-side connector is connected to the cable and a second end of the host-side connector is connected to the host-side power supply line.

The host-side power supply line connects the power supply unit with the cable. The power supply unit outputs a first voltage and applies the first voltage to the host-side power supply line.

The first current measurement unit measures a first current, the first current being a current flowing through the host-side power supply line.

The terminal device includes a terminal-device-side connector, a terminal-device-side power supply line, a measurement unit, and a terminal-device-side notification unit.

A first end of the terminal-device-side connector is connected to the cable and a second end of the terminal-device-side connector is connected to the terminal-device-side power supply line. The terminal-device-side power supply line is used to supply electric power into the terminal device, and is connected to the second end of the terminal-device-side connector.

The measurement unit receives a current that is branched from a predetermined reference point on the terminal-device-side power supply line. The measurement unit is a voltage measuring device that measures a second voltage, the second voltage being a voltage at the reference point. Alternatively the measurement unit includes a second resistor having a second resistance value and connected to the reference point, and a second current measuring device that measures a second current, the second current being a current flowing through the second resistor.

The terminal-device-side notification unit transmits the second voltage measured by the measurement unit, or the second current value measured by the measurement unit and the second resistance value to the host device as a terminal-device-side notification value.

The host device receives the terminal-device-side notification value from the terminal device, calculates a first resistance value indicating a resistance from the power supply unit to the reference point on the terminal-device-side power supply line based on the terminal-device-side notification value, the first voltage value, and the first current value measured by the first current measurement unit, and outputs the calculated first resistance value to the power supply unit.

The power supply unit adjusts the first voltage according to the first resistance value supplied from the host-side control unit and the first current value currently measured by the first current measurement unit at that moment so that the second voltage falls within a predetermined first reference range.

Note that any entity that is obtained by expressing the above-described system by replacing it with a method or an apparatus as well as the host device and the terminal device included in the system are also included in an aspect of the present invention.

According to a technique in accordance with the present invention, it is possible, in a communication system in which electric power is supplied form a host device to a terminal device, to reliably supply a power supply voltage having such a range that the terminal device can operate properly.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
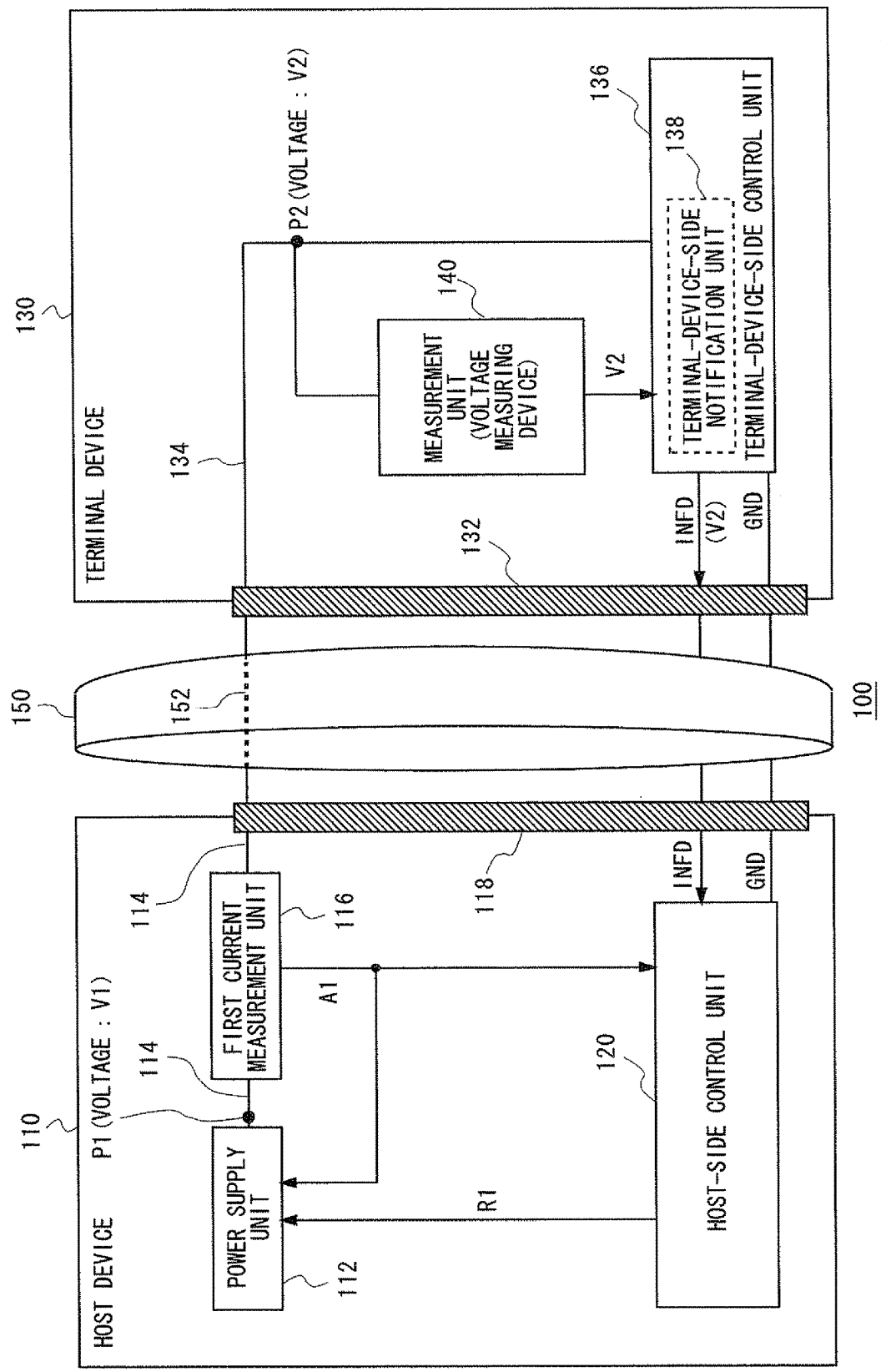
FIG. 1 shows a communication system according to a first embodiment of the present invention.

Embodiments according to the present invention are explained hereinafter with reference to the drawings. For clarifying the explanation, some parts of the following explanation and the drawings may be omitted or simplified as appropriate. Further, it is obvious for those skilled in the art that each element shown as a functional block that performs respective one of the various processes in the drawings may be implemented in various forms by using hardware, software (program), or combination thereof. That is, they are limited to neither hardware nor software. Note that the same symbols are assigned to the same components throughout the drawings, and their duplicated explanations are omitted as appropriate.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

First Embodiment

FIG. 1 shows a communication system 100 according to a first embodiment of the present invention. The communication system 100 includes a host device 110, a terminal device 130, and a cable 150 connecting the host device 110 with the terminal device 130. FIG. 1, straight lines with arrows indicate data flows. This feature is also applied to the other figures.

The cable 150 includes a power supply line 152, and the host device 110 supplies electric power to the terminal device 130 through the power supply line 152.

The host device 110 includes a power supply unit 112, a host-side power supply line 114, a first current measurement unit 116, a host-side connector 118, and a host-side control unit 120.

The power supply unit 112 applies a first voltage V1 to the host-side power supply line 114. That is, the voltage at the point (point P1) at which the host-side power supply line 114 is connected to the power supply unit 112 is the first voltage V1. Note that the power supply unit 112 can adjust the first voltage V1.

The host-side power supply line 114 connects the host device 110 with the host-side connector 118. The first current measurement unit 116 is disposed on the host-side power supply line 114, and measures a current A1 flowing through the host-side power supply line 114 (hereinafter called "first current"). The first current measurement unit 116 outputs the measured value of the first current A1 to the power supply unit 112 and the host-side control unit 120.

A first end of the host-side connector 118 is connected to the cable 150 (more specifically, the power supply line 152 inside the cable 150) and a second end of the host-side connector 118 is connected to the host-side power supply line 114.

The host-side control unit 120 receives a terminal-device-side notification value INFD from the terminal device 130 through the cable 150 (more specifically, a data line inside the cable 150 (not shown)), calculates a first resistance value R1, and outputs the calculated first resistance value R1 to the power supply unit 112. The terminal-device-side notification value INFD and the first resistance value R1 are explained later.

The terminal device 130 includes a terminal-device-side connector 132, a terminal-device-side power supply line 134, a terminal-device control unit 136, and a measurement unit 140.

A first end of the terminal-device-side connector 132 is connected to the cable 150 (power supply line 152) and a second end of the terminal-device-side connector 132 is connected to the terminal-device-side power supply line 134.

The terminal-device-side power supply line 134 is used to supply electric power into the terminal device 130, and is connected to the terminal-device control unit 136 as shown in the figure. Note that the voltage at the reference point P2 on the terminal-device-side power supply line 134 is defined within the first reference range, and this first reference range is the power supply voltage range in which the terminal device 130 can operate properly.

On the terminal-device-side power supply line 134, a current is branched from the reference point P2. The measurement unit 140 receives the current branched from the reference point P2, measures the voltage V2 at the reference point P2 (hereinafter called "second voltage"), and outputs the measured voltage V2 to the terminal-device control unit 136.

The terminal-device control unit 136 can communicate with the host-side control unit 120 and includes a terminal-device-side notification unit 138.

The terminal-device-side notification unit 138 outputs the value of the second voltage V2 received from the measurement' unit 140 to the host-side control unit 120 as a terminal-device-side notification value INFD.

Upon receiving the terminal-device-side notification value INFD (value V20 of current second voltage V2 in this example), the host-side control unit 120 calculates a first resistance value R1 according to the following Expression (1) based on the terminal-device-side notification value INFD, the value of the first voltage V1 (V10) at that moment, and the first current A1 (A10) at that moment.

$$R1=(V10-V20)/A10 \quad (1)$$

That is, in the communication system 100 according to this embodiment, the terminal-device-side notification value INFD is a voltage value at the reference point P2 on the terminal-device-side power supply line 134. Further, the first resistance value R1 is a resistance from the point P1 to the reference point P2.

The host-side control unit 120 outputs the calculated first resistance value R1 to the power supply unit 112. The power supply unit 112 adjusts the first voltage V1 according to the first resistance value R1 supplied from the host-side control unit 120 and the value of the first current A1 that is supplied from the first current measurement unit 116 at that moment so that the first voltage V1 falls within a range between the maximum value V1max of the first voltage V1 expressed by Expression (2) shown below and the minimum value V1min of the first voltage V1 expressed by Expression (3) shown below.

$$V1max=(\text{maximum value of first reference range})/(A1 \times R1) \quad (2)$$

$$V1min=(\text{minimum value of first reference range})/(A1 \times R1) \quad (3)$$

Owing to the above-described adjustment made by the power supply unit 112, the second voltage V2 always remains within the first reference range.

For example, if the first resistance value R1 is larger than the normally-expected value and thus the second voltage V2 exceeds the maximum value of the first reference range, the power supply unit 112 can lower the second voltage V2 to a value within the first reference range by lowering the first voltage V1. Likewise, if the first resistance value R1 is smaller than the normally-expected value and thus the second voltage V2 decreases below the minimum value of the first reference range, the power supply unit 112 can raises the second voltage V2 to a value within the first reference range by raising the first voltage V1.

Further, since the first current A1, which is used in above-mentioned Expressions (2) and (3), is the value of the first current that is measured in real time, even when the current consumption of the terminal device 130 increases/decreases sharply for a brief moment, the first voltage V1 can be adjusted so that the second voltage V2 remains within the first reference range.

As described above, according to the communication system 100 in accordance with this embodiment, the host device 110 adjusts the first voltage V1 according to the first resistance value R1 and the first current A1, which change according to the actually-used cable 150, so that the second voltage V2 always remains within the first reference range. Therefore, it is possible to reliably supply the power supply voltage having such a range that the terminal device 130 can operate properly even when the cable 150 is changed or even when the current consumption of the terminal device 130 changes sharply.

Further, in the communication system 100 according to this embodiment, the transmission/reception of the terminal-device-side notification value INFD can be performed by using normal communication between the host and the terminal device. In addition, only the second voltage V2 needs to be provided on the terminal-device side in order to perform the above-described adjustment. Therefore, there is no need to provide any additional device outside the host and the terminal device, such as the booster inserted on the cable connecting the host with the device disclosed in Japanese Unexamined Patent Application Publication No. 2008-305148.

In the above-described communication system 100, the terminal device 130 transmits the second voltage V2 to the host device 110 as the terminal-device-side notification value INFD. This terminal-device-side notification value INFD may be a value other than the second voltage V2 that can be used to calculate the second voltage V2. This feature is explained hereinafter with reference to a second embodiment.

Second Embodiment

Figure 2:
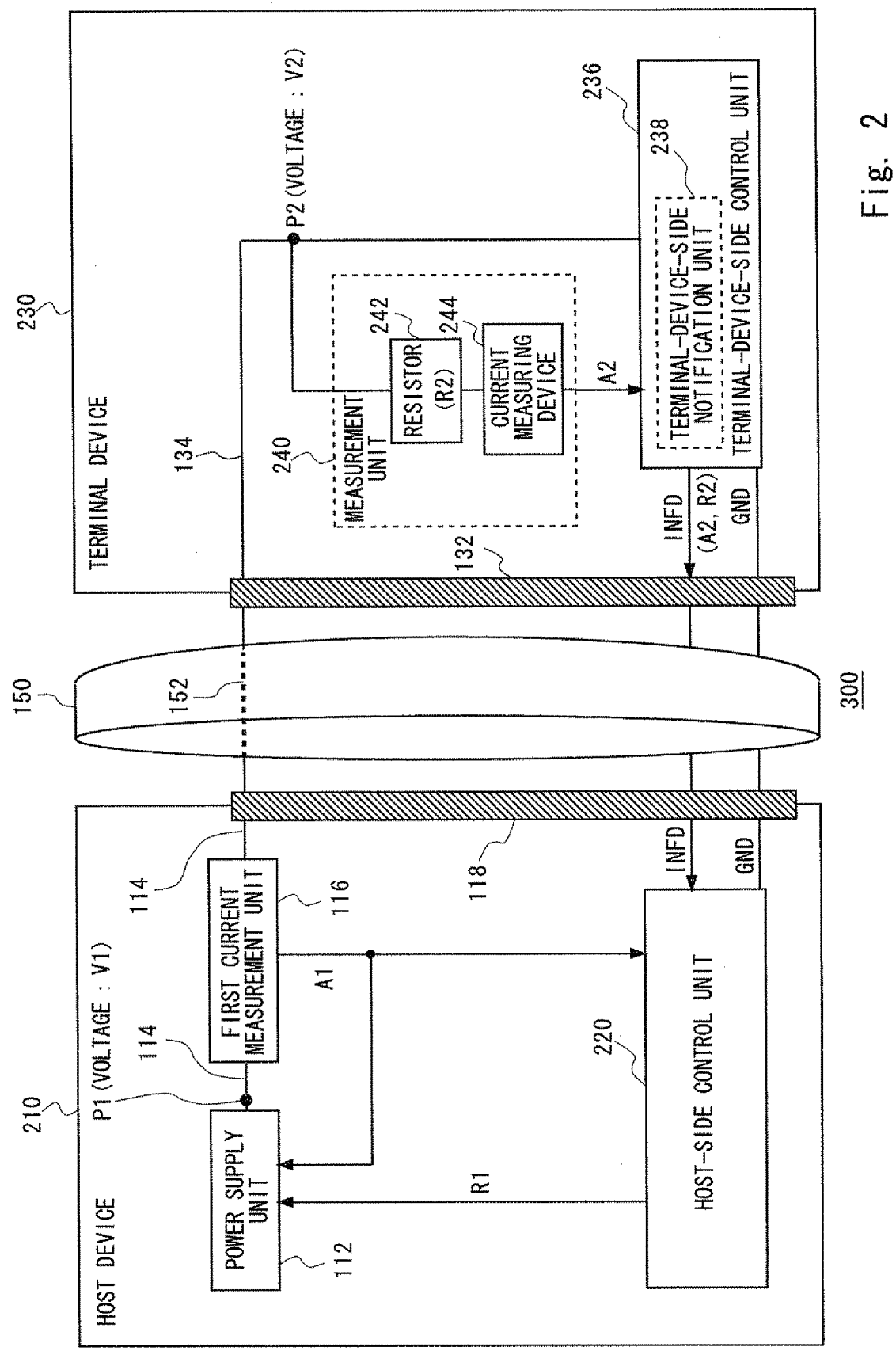
FIG. 2 shows a communication system according to a second embodiment of the present invention.

FIG. 2 shows a communication system 200 according to a second embodiment of the present invention. The communication system 200 includes a host device 210, a terminal device 230, and a cable 150 connecting the host device 210 with the terminal device 230. For simplifying the explanation, only the parts of the communication system 200 that are different from the communication system 100 are explained.

In the communication system 200, the terminal device 230 is different from the terminal device 130 of the communication system 100. In the terminal device 230, the measurement unit 240 and the terminal-device control unit 236 are different from the measurement unit 140 and the terminal-device control unit 136, respectively, of the terminal device 230. However, the terminal-device control unit 236 is similar to the terminal-device control unit 136 except that the terminal-device-side notification unit 238 is different from the terminal-device-side notification unit 138 of the terminal-device control unit 136.

As shown in the figure, in the communication system 200, the measurement unit 240 receives a current branched from the reference point P2 as in the case of the measurement unit 140. However, the measurement unit 240 is composed of a second resistor 242 connected to the reference point P2 and a second current measuring device 244 that measures a current A2 flowing through the second resistor 242 (hereinafter called "second current"). The second resistor 242 has a known second resistance value R2. The measurement unit 240 outputs the value of the second current A2 measured by the second current measuring device 244 to the terminal-device-side notification unit 238.

The terminal-device-side notification unit 238 holds the second resistance value R2 in advance. When the terminal-device-side notification unit 238 receives the second current A2 from the measurement unit 240, the terminal-device-side notification unit 238 transmits the second resistance value R2 and the value of the second current A2 to the host-side control unit 120 as the terminal-device-side notification value INFD.

The host device 210 is similar to the host device 110 of the communication system 100 except that the host-side control unit 220 is different from the host device 210 of the communication system 100.

The host-side control unit 220 is similar to the host-side control unit 120 of the host device 110 of the communication system 100 except that the host-side control unit 220 obtains the second voltage V2 by calculating the second voltage V2 according to the above-mentioned Expression (3) by using the terminal-device-side notification value INFD (second resistance value R2 and value of second current A2 in this example) received from the terminal device 230.

$$V2=A2 \times R2 \qquad (3)$$

The communication system 200 according to this embodiment can also provide similar advantageous effects to those of the communication system 100.

Third Embodiment

Figure 3:
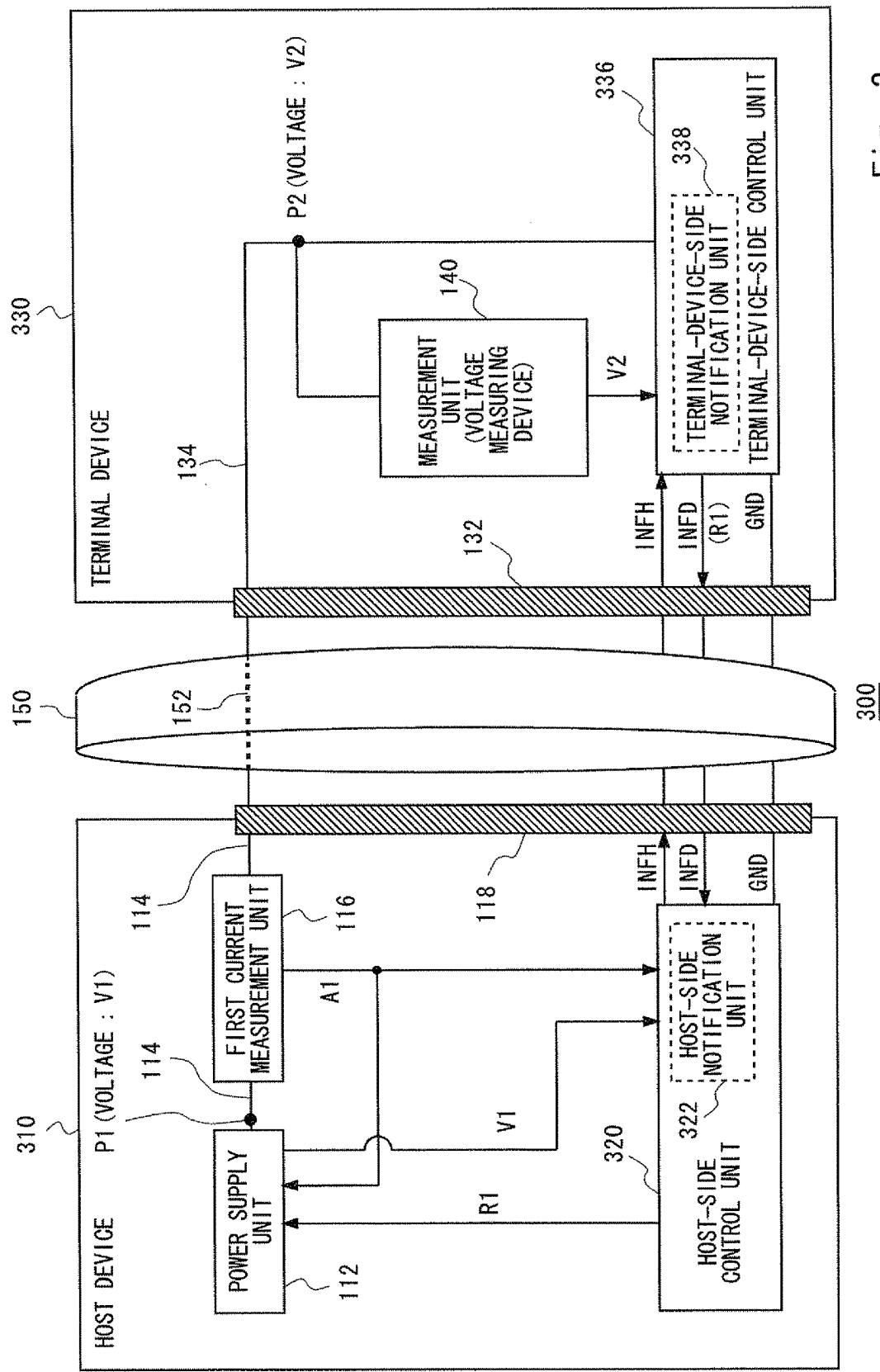
FIG. 3 shows a communication system according to a third embodiment of the present invention.

FIG. 3 shows a communication system 300 according to a third embodiment of the present invention. The communication system 300 includes a host device 310, a terminal device 330, and a cable 150 connecting the host device 310 with the terminal device 330. For simplifying the explanation, only the parts of the communication system 300 that are different from the communication system 100 are explained.

The host device 310 in the communication system 300 is similar to the host device 110 of the communication system 100 except that the host-side control unit 320 is different from the host-side control unit 120 of the communication system 100.

The host-side control unit 320 includes a host-side notification unit 322. The host-side notification unit 322 receives the value of the first voltage V1 output by the power supply unit 112 and the value of the first current A1 measured by the first current measurement unit 116, and transmits these values to the terminal device 330 as a host-side notification value INFH. Further, in this embodiment, the terminal-device-side notification value INFD, which the host-side control unit 320 receives from the terminal device 330, is the first resistance value R1. Therefore, the host-side control unit 320 does not need to calculate the first resistance value R1, and thus outputs the terminal-device-side notification value INFD (first resistance value R1 in this example) received from the terminal device 330, directly to the power supply unit 112.

The terminal device 330 is different from the terminal device 130 of the communication system 100. In the terminal device 330, the terminal-device-side control unit 336 is different from the terminal-device control unit 136 of the terminal device 130. The terminal-device-side control unit 336 is similar to the terminal-device control unit 136 except that the terminal-device-side notification unit 338 is different from the terminal-device-side notification unit 138 of the terminal-device control unit 136.

The terminal-device-side notification unit 338 calculates the first resistance value R1 based on the value of the second voltage V2 output from the measurement unit 140 and the host-side notification value INFH received from the host-side control unit 320, and outputs the calculated first resistance value R1 to the host device 310 as the terminal-device-side notification value INFD.

The communication system 300 is similar to the communication system 100 except for the above-described differences. The communication system 300 can also provide similar advantageous effects to those of the communication system 100.

Note that in the communication system 300 according to this embodiment, the terminal device 330 includes the measurement unit 140, and the first resistance value R1 is calculated based on the value of the second voltage V2 measured by the measurement unit 140 and the host-side notification value INFH supplied from the host device 310. However, the communication system 300 may be configured in such a manner that: the measurement unit 240 of the terminal device 230 of the communication system 200 is provided as a substitute for the measurement unit 140; the second voltage V2 is calculated from the value of the second current A2 measured by the measurement unit 240 and the second resistance value R2; and then the first resistance value R1 is calculated based on the second voltage V2 and the host-side notification value INFH.

Note that for simplifying the explanation, the adjustment of the first voltage V1 and the timing of communication performed between the host device and the terminal device for the adjustment are not mentioned in the explanation of the above-described three embodiments. However, there are various possible ways of performing these processes.

In this type of the communication system, in general, immediately after a terminal device is connected, a sequence called "Sign-On" is performed to make the host device recognize the terminal device. For example, communication may be performed between the host device and the terminal device during this sequence in order to supply the first resistance value R1 to the power supply unit 112 of the host device. Then, after the first resistance value R1 is supplied to the power supply unit 112, the communication, which has been performed to exchange the terminal-device-side notification value INFD and/or the host-side notification value INFH between the host ant the terminal device, may be stopped.

Further, as for the timing of the adjustment of the first voltage V1, for example, after the first resistance value R1 is obtained at the time of the Sign-On, the power supply unit 112 may hold the first resistance value R1 in advance, and may adjust the first voltage V1 according to the value of the first current A1 by continuously monitoring the first current A1 after that. Alternatively, for example, the first voltage V1 may be adjusted at the time of the Sign-On so that the second voltage V2 has a predetermined value (e.g., intermediate value) within the first reference range. Then, after that the first voltage V1 may be adjusted at regular intervals according to the held first resistance value R1 and the value of the first current A1 at that moment.

Needless to say, in addition to or instead of the above-described timings, the adjustment may be performed when an instruction is provided by a user and/or when the replay from the terminal device is delayed.

Forth Embodiment

Figure 4:
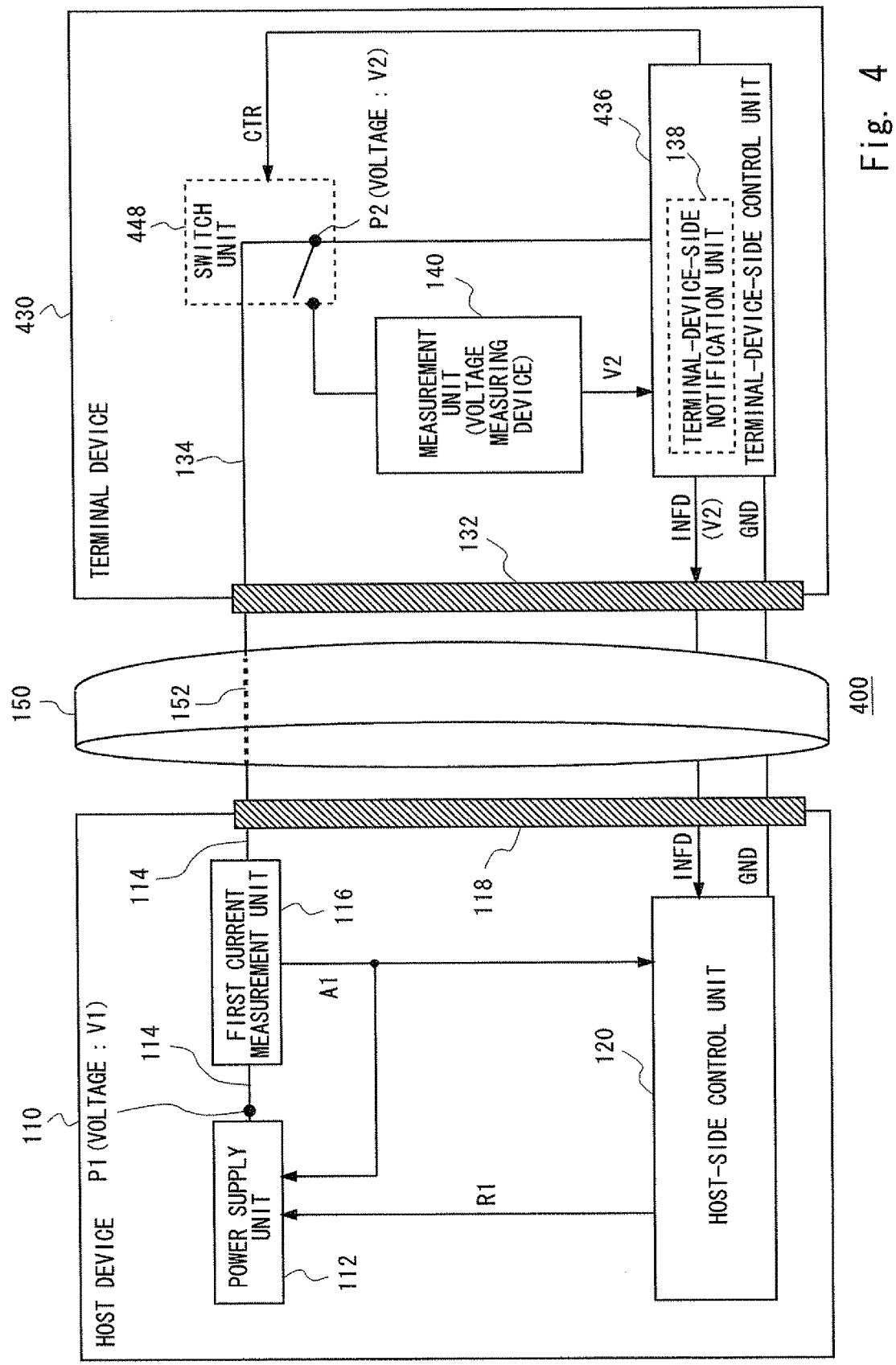
FIG. 4 shows a communication system according to a fourth embodiment of the present invention.

FIG. 4 shows a communication system 400 according to a fourth embodiment of the present invention. The communication system 400 includes a host device 110, a terminal device 430, and a cable 150 connecting the host device 110 with the terminal device 430. For simplifying the explanation, only the parts of the communication system 400 that are different from the host device 110 are explained.

In the communication system 400, the terminal device 430 is different from the terminal device 130 of the communication system 100. The terminal device 430 has two modes including a detection mode and a normal operation mode. In the terminal device 430, the terminal-device-side control unit 436 is different from the terminal-device control unit 136 of the terminal device 130. Further, the terminal device 430 includes a switch unit 448. Note that the terminal-device-side control unit 436 is similar to the terminal-device control unit 136 except that the terminal-device-side control unit 436 can output a mode control signal CTR to the switch unit 448.

The switch unit 448 can switch the connection state between the measurement unit 140 and the reference point P2 so that the measurement unit 140 is connected with the reference point P2 or is disconnect from the reference point P2. This switching is performed based on the mode control signal CTR supplied from the terminal-device-side control unit 436.

The terminal-device-side control unit 436 outputs a mode control signal CTR indicating "detection mode" to the switch unit 448 before the host device 110 is not yet ready for adjusting the first voltage V1, i.e., before the host device 110 is not yet ready for calculating the first resistance value R1, for example, immediately after the terminal device 430 is connected to the host device 110. In response to this, the switch unit 448 connects the reference point P2 with the measurement unit 140, and the value of the second voltage V2 is thereby output from the measurement unit 140. Further, the terminal-device-side notification value INFD is transmitted from the terminal-device-side notification unit 138 to the host device 110.

After the terminal-device-side notification unit 138 transmits the terminal-device-side notification value INFD to the host device 110, i.e., after the host device 110 becomes ready for calculating the first resistance value R1, the terminal-device-side control unit 436 outputs a mode control signal CTR indicating "normal operation mode" to the switch unit 448. In response to this, the switch unit 448 disconnects the reference point P2 from the measurement unit 140, and the operation of the measurement unit 140 is stopped.

The communication system 400 according to this embodiment can also provide similar advantageous effects to those of the communication system 100. In addition, the communication system 400 disconnects the reference point P2 from the measurement unit 140 after the host device 110 becomes ready for calculating the first resistance value R1. Therefore, after that, since no electric power is consumed by the measurement unit 140, the power consumption of the entire system can be reduced.

Note that the current consumption of the terminal device 430 (which is equal to the first current A1) changes depending on whether the measurement unit 140 is connected to the reference point P2 or not even when the current consumption of each of the function blocks other than the measurement unit 140 is unchanged. However, since the power supply unit 112 of the host device 110 adjusts the first voltage V1 according to the first current A1 that is measured in real time, the first voltage V1 can be correctly adjusted even after the measurement unit 140 is disconnected from the reference point P2.

Needless to say, the switch unit 448, which disconnects the reference point P2 from the measurement unit 240 after the transmission of the terminal-device-side notification value INFD, may be also provided in the terminal device 230 of the communication system 200 so that the power consumption of the entire system is reduced. This is also true for the terminal device 330 of the communication system 300.

Fifth Embodiment

Figure 5:
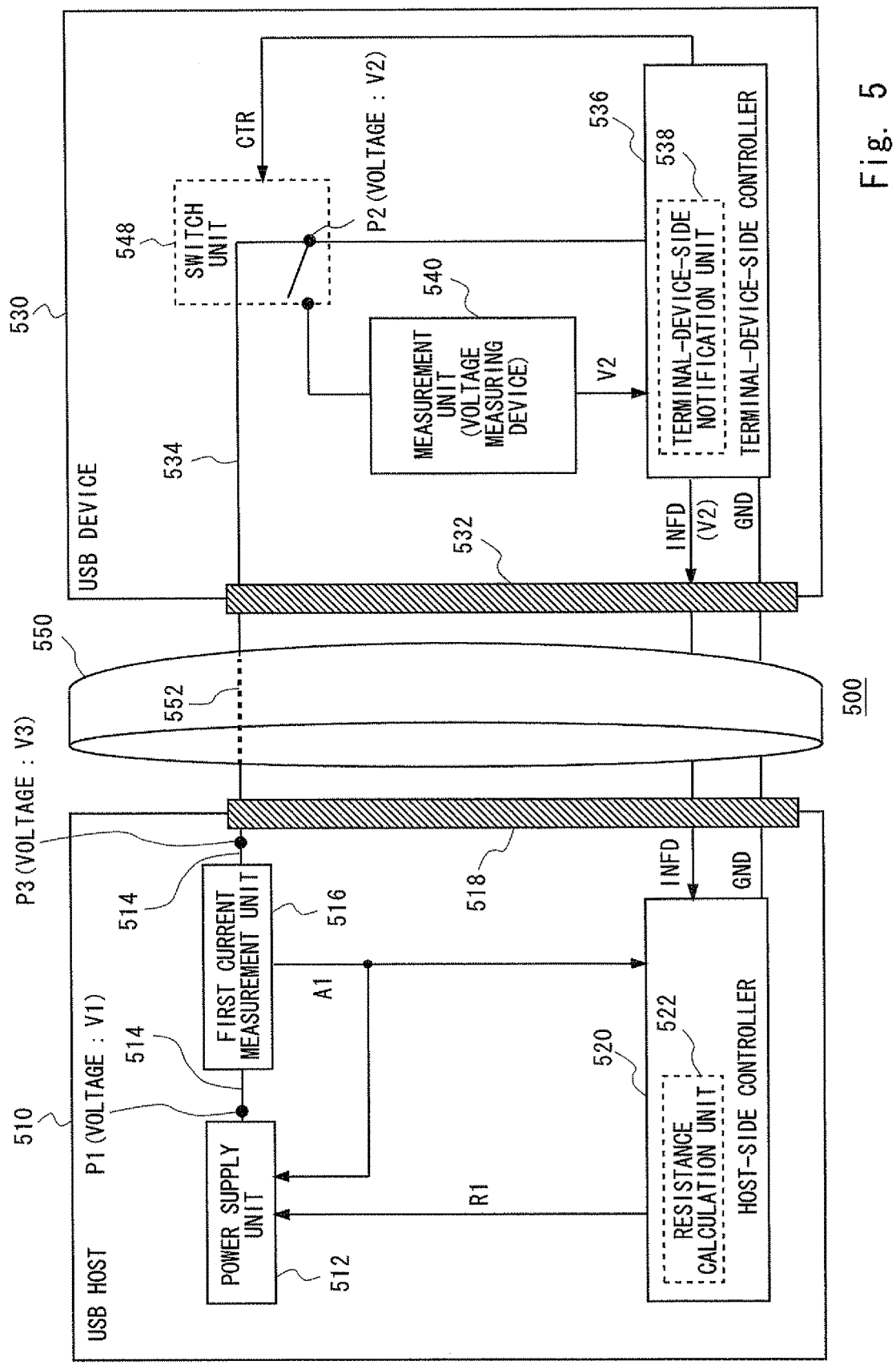
FIG. 5 shows a communication system according to a fifth embodiment of the present invention.

FIG. 5 shows a communication system 500 according to a fifth embodiment of the present invention. The communication system 500 conforms to the USB standards, and includes a USB host 510, a USB device 530, and a USB cable 550.

The USB cable 550 includes a VBUS 552 that connects the USB host 510 with the USB device 530, and serves as a power supply line.

The USB host 510 includes a power supply unit 512, a host-side VBUS 514, a first current measurement unit 516, a host-side connector 518, and a host controller 520.

A first end of the host-side connector 518 is connected to the VBUS 552 inside the USB cable 550 and a second end of the host-side connector 518 is connected to the host-side VBUS 514.

The host-side VBUS 514 connects the power supply unit 512 with the host-side connector 518. The power supply unit 512 applies a first voltage V1 to the host-side VBUS 514. As shown in figure, the first voltage V1 is a voltage at the connection point between the power supply unit 512 and the host-side VBUS 514 (point P1). Further, the power supply unit 512 can adjust the first voltage V1 applied to the host-side VBUS 514.

The first current measurement unit 516 is provided on the host-side VBUS 514, and measures a first current A1 flowing through the host-side VBUS 514 and outputs the measured values to the power supply unit 512 and the host controller 520.

The host controller 520 has similar functions to those of the conventional host controller in a USB system, and further includes a resistance calculation unit 522. The resistance calculation unit 522 is explained later.

The host controller 24 can control the power supply unit 22 and performs various communications with the terminal-device controller 34 of the terminal device 30 through the USB cable 40. Further, the host controller 24 also converts various data to be transmitted to the terminal device 30 into packets and converts packets of various data received from the USB device 530 into the original date format.

The USB device 530 includes a terminal-device-side connector 532, a terminal-device-side VBUS 534, a terminal device controller 536, a measurement unit 540, and a switch unit 548.

A first end of the terminal-device-side connector 532 is connected to the VBUS 552 inside the USB cable 550 and a second end of the terminal-device-side connector 532 is connected to the terminal-device-side VBUS 534.

The terminal-device-side VBUS 534 is connected to the terminal-device-side connector 532 and thereby supplies electric power into the USB device 530.

The terminal device controller 536 has a function of outputting a mode control signal CTR to the switch unit 548 in addition to the functions similar to those of the convention device controller in a USB system. Further, the terminal device controller 536 includes a terminal-device-side notification unit 538. The mode control signal CTR and the terminal-device-side notification unit 538 are explained later. Note that similarly to the conventional device controller, the terminal device controller 536 converts various data to be transmitted to the USB host 510 into packets and converts packets of various data received from the USB host 510 into the original date format.

The switch unit 548 is disposed on the terminal-device-side VBUS 534, and performs switching of the connection state between the reference point P2 on the terminal-device-side VBUS 534 and the measurement unit 540, such as connecting the reference point P2 with the measurement unit 540 and disconnecting the reference point P2 from the measurement unit 540. This switching is performed according to the mode control signal CTR.

Note that in the communication system 500 according to this embodiment, the USB device 530 has two modes including "detection mode" and "normal operation mode". The switch unit 548 connects the reference point P2 with the measurement unit 540 when the mode control signal CTR indicates "detection mode", and disconnects the reference point P2 from the measurement unit 540 when the mode control signal CTR indicates "normal operation mode"

When the measurement unit 540 is connected with the reference point P2, the measurement unit 540 receives a current branched from the terminal-device-side VBUS 534, measures a voltage at the reference point P2 (second voltage V2), and outputs the measured value to the terminal device controller 536. Note that when the measurement unit 540 is disconnected from the reference point P2, the measurement unit 540 does not operate.

In the terminal device controller 536, the terminal-device-side notification unit 538 converts the second voltage V2 received from the measurement unit 540 into packets and transmits the packets to the USB host 510 as the terminal-device-side notification value INFD.

Further, the terminal device controller 536 outputs a mode control signal CTR indicating "detection mode" to the switch unit 548 immediately after the USB device 530 is connected with the USB host 510. Further, after the terminal-device-side notification unit 538 transmits the terminal-device-side notification value INFD to the USB host 510, the terminal device controller 536 outputs a mode control signal CTR indicating "normal operation mode" to the switch unit 548.

In the USB host 510, the host controller 520 obtains the second voltage V2 by converting the packets of the terminal-device-side notification value INFD into the original data format. Further, the resistance calculation unit 522 calculates the value of the resistance from the point P1 to the reference point P2 based on the value of the first voltage V1, the value of the first current A1, and the value of the second voltage V2 obtained by converting the packets of the terminal-device-side notification value INFD into the original data format, and outputs the calculated resistance value to the power supply unit 512. This resistance values is the above-described first resistance value R1.

After the first resistance value R1 is supplied from the host controller 520, the power supply unit 512 adjusts the first voltage V1 based on the first resistance value R1 and the value of the first current A1 measured by the first current measurement unit 516 at that moment so that the second voltage V2 falls within the first reference range on the condition that a voltage at the point P3 on the host-side VBUS 514 (hereinafter called "third voltage V3") is within a second reference range.

The point P3 is a point immediately in front of the first end of the host-side connector 518, i.e., the end at which the host-side connector 518 is connected to the host-side VBUS 514. As described previously, the USB 2.0 standards specify that the voltage at the point P3 (third voltage V3) should be within a range from 4.75 v to 5.25 v. This range from 4.75 v to 5.25 v is the above-described second reference range.

The first reference range is the range of the second voltage V2 that is defined so that the USB device 530 operates properly. For example, the first reference range is defined for the power supply unit 512 based on empirical values or the like, and is held in the power supply unit 512 in advance.

If the first reference range, the first resistance value R1, and the first current A1 at that moment are known, it is possible to calculate the range of the first voltage V1 necessary for putting the second voltage V2 within the first reference range.

Further, if the value of the resistance from the point P1 to the point P3 (hereinafter called "third resistance R3"), the second reference range, and the first current A1 at that moment are known, it is possible to calculate the range of the first voltage V1 necessary for putting the third voltage V3 within the second reference range. Note that the third resistance R3 is the resistance of the wiring from the power supply unit 512 to the host-side connector 518 in the USB host 510. For example, the third resistance R3 may be defined for the power supply unit 512 and held in the power supply unit 512 in advance.

That is, in the communication system 500 according to this embodiment, the power supply unit 512 adjusts the first voltage V1 so that the second voltage V2 remains within the first reference range and the third voltage V3 remains within the second reference range.

Figure 6:
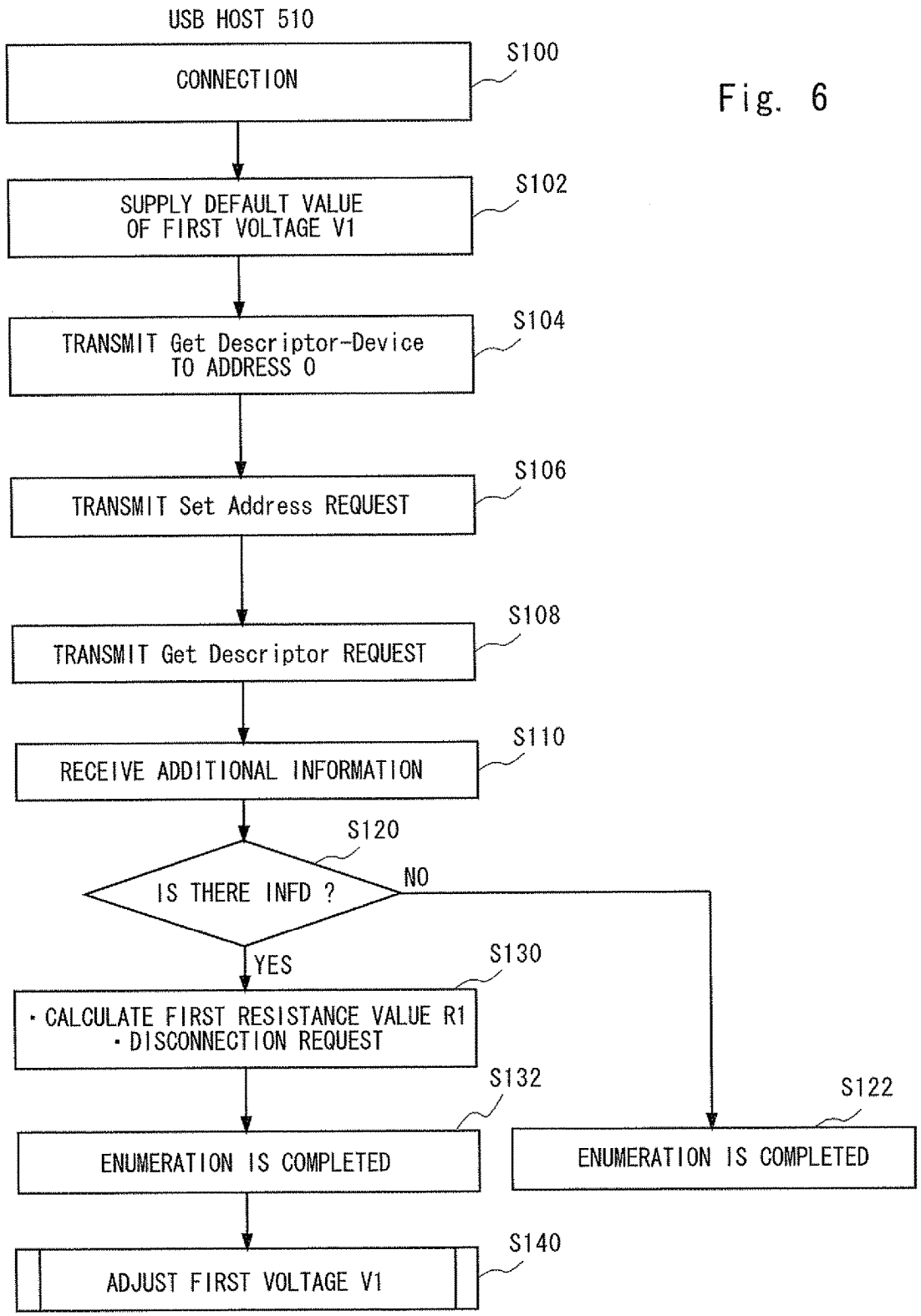
FIG. 6 is a flowchart showing a process flow of a USB host in the communication system shown in FIG. 5 (part 1)
Figure 7:
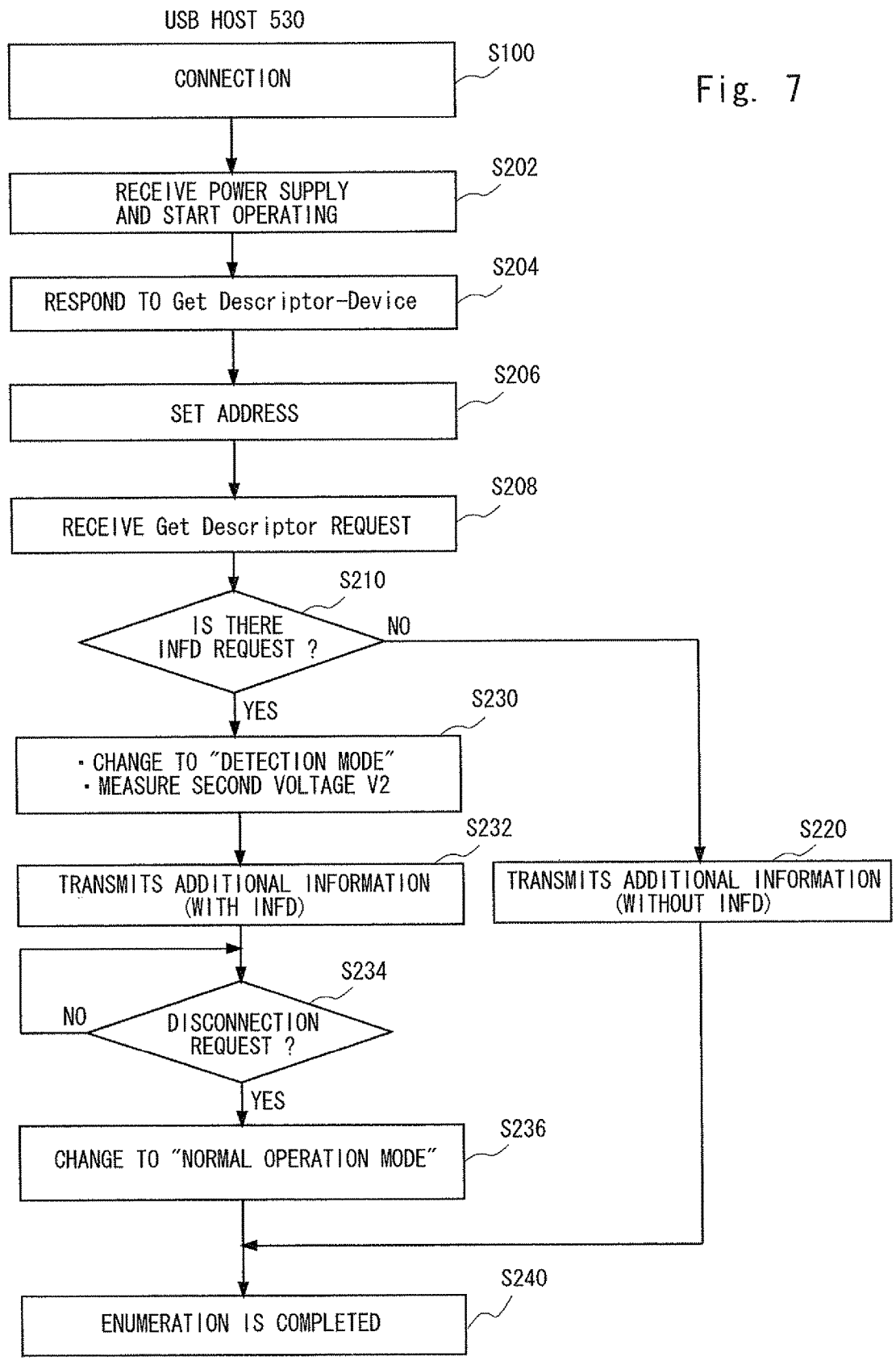
FIG. 7 is a flowchart showing a process flow of a USB device in the communication system shown in FIG. 5.
Figure 8:
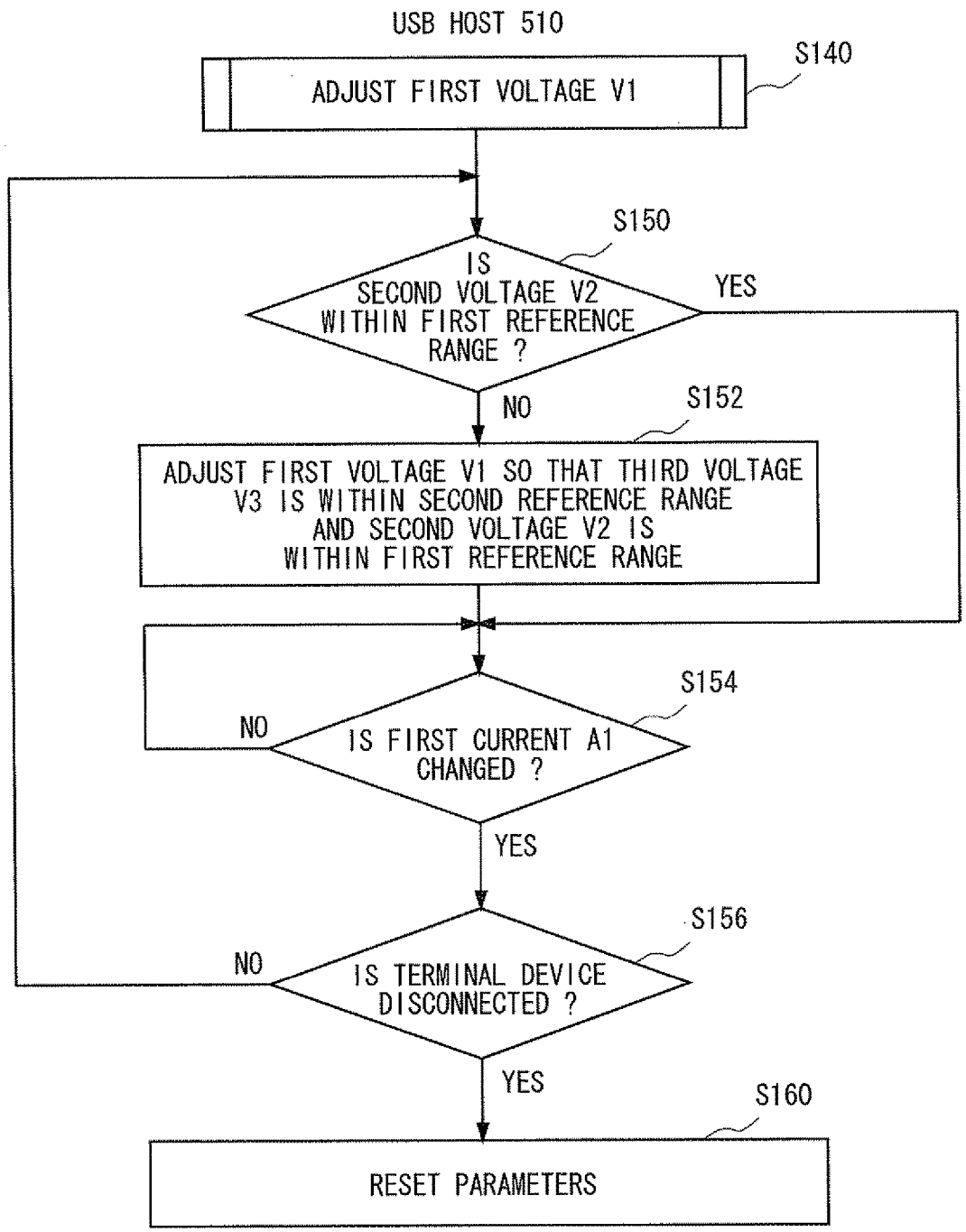
FIG. 8 is a flowchart showing a process flow of a USB host in the communication system shown in FIG. 5 (part 2)

A process flow of the communication system 500 is explained in detail with reference to flowcharts shown in FIGS. 6 to 8. FIG. 6 shows a process flow performed by the USB host 510, and FIG. 7 shows a process flow performed by the USB device 530. FIG. 8 shows a flow of "first voltage V1 adjustment" process performed in the step S140 of FIG. 6. Note that a default value of the first voltage V1, the first reference range, the second reference range, and the value of the resistance from the point P1 to the point P3 are set in the power supply unit 512 of the USB host 510 in advance. Further, the default value of the first voltage V1 is also set in the resistance calculation unit 522 of the host controller 520. Further, for simplifying the explanation, the illustration of the conventional processes performed in the USB system is partially omitted in FIGS. 6 to 8.

Immediately after the USB device 530 is connected with the USB host 510, the USB host 510 and the USB device 530 perform Sign-On, i.e., the process to recognize the device connection. A series of sequences of this Sign-On is called "enumeration" in the USB standards.

As shown in FIG. 6, when the USB device 530 is connected with the USB host 510 (S100), the power supply unit 512 of the USB host 510 applies the first voltage V1 having the default value to the host-side VBUS 514 (S102). As a result, electric power starts to be supplied to the USB device 530 thorough the host-side VBUS 514, the host-side connector 518, the VBUS 552, the terminal-device-side connector 532, and the terminal-device-side VBUS 534.

Then, the host controller 520 of the USB host 510 sends Get Descriptor-Device to the address 0 as the first step of the enumeration (S104). Note that the address of every USB device is set to "0" immediately after the USB device is connected to the USB host.

Every USB device has a table called "device-descriptor". In the device-descriptor, the attributes of the device and all the information necessary to install the driver are described. The USB device 530 responds to the Get Descriptor-Device sent from the USB host 510, and the host controller 520 recognizes the size of packet that the USB device 530 can transmit and the endpoint number supported by the USB device 530 from this response. After receiving this response, the host controller 520 transmits a Set Address request to the USB device 530 and thereby assigns an address to the USB device 530 (S106).

Next, the host controller 520 transmits a Get Descriptor request to the USB device 530 and thereby requests additional information from the USB device 530 (S108). Then, the host controller 520 receives additional information that is sent back by the USB device 530 in response to the Get Descriptor request (S110). In this way, the USB host 510 obtains all the information necessary for the communication with the USB device 530.

In the communication system 500 according to this embodiment, the host controller 520 incorporates "terminal-device-side notification value INFD request", which is used to check whether the USB device 530 has "detecting function" or not, into the Get Descriptor request. Note that "detecting function" means a function of measuring a voltage at the reference point P2 (second voltage V2) and notifying the measured voltage to the USB host 510, performed by the USB device 530.

The host controller 520 checks whether or not the terminal-device-side notification value INFD is included in the additional information sent back by the USB device 530 in response to the Get Descriptor request (S120). When the terminal-device-side notification value INFD is included (S120: Yes), the host controller 520 determines that the USB device 530 has "detecting function". Then, the resistance calculation unit 522 of the host controller 520 calculates the value of the resistance from the point P1 to the reference point P2 (first resistance value R1) based on the terminal-device-side notification value INFD (second voltage V2 in this example), the pre-defined default value of the first voltage V1, and the value of the first current A1 measured by the host-side VBUS 514, and outputs the calculated resistance value to the power supply unit 512. In parallel to this process, the host controller 520 transmits a disconnection request to the USB device 530 (S130).

With this, the enumeration is completed (S132), and the USB host 510 and the USB device 530 perform ordinary communication after that. In the communication system 500 according to this embodiment, the host controller 520 also adjusts the first voltage V1 after the completion of the enumeration (S140). This process is explained later with reference to FIG. 8.

On the other hand, when the terminal-device-side notification value INFD is not included in the additional information sent back by the USB device 530 in response to the Get Descriptor request (S120: No), the host controller 520 determines that the USB device 530 does not have "detecting function". With this, the enumeration is completed (S220). After that, the USB host 510 performs ordinary communication with the USB device 530.

Referring to FIG. 7, an operation of the USB device 530 is explained. When the USB device 530 is connected to the USB host 510 (S100), electric power is supplied from the USB host 510 to the USB device 530 (S102 in FIG. 6). Therefore, the USB device 530 starts to operate (S202).

When the USB device 530 receives the Get Descriptor-Device sent by the USB host 510 in the step S104 of FIG. 6, the terminal device controller 536 of the USB device 530 transmits a response including the size of packet that the USB device 530 can transmit and the endpoint number supported by the USB device 530 to the USB host 510 (S204).

Next, when USB device 530 receives the Get Descriptor request sent by the USB host 510 in the step S106 of FIG. 6 (S208), the terminal device controller 536 checks whether or not "terminal-device-side notification value INFD request" is included in the Get Descriptor request (S210).

When "terminal-device-side notification value INFD request" is included in the Get Descriptor request (S210: Yes), the terminal device controller 536 transmits a mode control signal CTR indicating "detection mode" to the switch unit 548. The switch unit 548 connects the reference point P2 with the measurement unit 540 in response to the mode control signal CTR. In this way, the measurement unit 540 measures the second voltage V2 at the reference point P2 and outputs the measured value to the terminal device controller 536 (S230).

Then, the terminal-device-side notification unit 538 of the terminal device controller 536 transmits the value of the second voltage V2 received from the measurement unit 540 together with the ordinary additional information to the USB host 510 as the terminal-device-side notification value INFD (S232).

After that, the terminal device controller 536 waits for a disconnection request (S234: No). Then, when the terminal device controller 536 receives the disconnection request from the USB host 510 (S234: Yes), the terminal device controller 536 outputs a mode control signal CTR indicating "normal operation mode" to the switch unit 548 (S236). As a result, the switch unit 548 disconnects the reference point P2 from the measurement unit 540. With this, the enumeration is completed (S240).

On the other hand, when "terminal-device-side notification value INFD request" is not included in the Get Descriptor request (S210: No), the terminal device controller 536 does not perform switching to "detection mode" and transmits the ordinary additional information including no terminal-device-side notification value INFD to the USB host 510 (S220). With this, the enumeration is completed (S240).

Note that in each of the processes explained above with reference to FIGS. 6 and 7, the data transmitted/received between the USB host 510 and the USB device 530 is converted into packets according to the USB standards on the transmission side before the transmission and the packets are converted into the original data format on the reception side.

Referring to FIG. 8, "first voltage V1 adjustment" process performed in the step S140 of the flowchart shown in FIG. 6 is explained. This process is performed by the power supply unit 512 of the USB host 510 after the enumeration between the USB host 510 and the USB device 530 is completed and until the USB device 530 is disconnected from the USB host 510.

As shown in FIG. 8, after the first resistance value R1 is supplied, the power supply unit 512 first checks whether or not the second voltage V2 is within the first reference range based on the first resistance value R1 and the first current A1 measured by the first current measurement unit 516 at that moment (S150).

When the second voltage V2 is within the first reference range (S150: Yes), the power supply unit 512 does not change the first voltage V1 and proceeds to a step S154.

On the other hand, when the second voltage V2 is not within the first reference range (S150: No), the power supply unit 512 changes the first voltage V1 (S152) and proceeds to the step S154. More specifically, in the step S152, the power supply unit 512 changes the first voltage V1 so that the second voltage V2 falls within the first reference range on the condition that the third voltage V3 does not deviate from the second reference range.

After that, the power supply unit 512 continues monitoring whether the first current A1 measured by the first current measurement unit 516 changes or not (S154: No). Then, when the first current A1 has changed, the power supply unit 512 further checks whether or not the USB device 530 is disconnected from the USB host 510 (S154: Yes, S156).

When the USB device 530 is not disconnected from the USB host 510 (S156: No), the power supply unit 512 returns to the step S150. After that, the process at the step S150 and the subsequent processes are repeated (from S150).

On the other hand, when the USB device 530 is disconnected from the USB host 510 (S156: Yes), the power supply unit 512 and the host controller 520 reset all the parameters to the initial values (S160).

Similarly to each of the above-described embodiments, in the communication system 500 according to this embodiment, the power supply unit on the host device side obtains and holds the value of the resistance from the point P1 to the reference point P2 (first resistance value R1), and adjusts the first voltage V1 based on the first resistance value R1 and the measured value of the current flowing through the host-side VBUS 514, the VBUS 552, and the terminal-device-side VBUS 534 (first current A1) so that the second voltage V2 falls within the first reference range. Therefore, similarly to each of the above-described communication systems, it is possible to reliably supply the power supply voltage having such a range that the device can operate properly regardless of the state of the cable connecting the host with the terminal device, the contact resistance of the connector, and/or the fluctuations of the current consumed by the terminal device.

Further, since the first voltage V1 is adjusted under the condition that the third voltage V3 is within the second reference range, the first voltage V1 is not changed excessively and the deviation of the first voltage V1 from the USB standards can be thereby prevented.

Incidentally, the USB devices are usually desired to be miniaturized for the convenience and the like. In the communication system 500 according to this embodiment, since the first resistance value R1 is calculated on the USB host 510 side, the USB device 530 needs to be equipped only with the switch unit 548 and the measurement unit 540 in comparison to the ordinary USB device. Therefore, the increase in size of the USB device can be minimized. As for the terminal-device-side notification unit 538, a functional block that is provided in the ordinary device controller and converts data to be transmitted to the USB host into packets may be used.

Further, the transmission/reception of the terminal-device-side notification value INFD, which is performed before the first resistance value R1 is supplied to the power supply unit 512, is performed during the enumeration, and the power supply unit 512 adjusts the first voltage V1 after the power supply unit 512 obtains and holds the first resistance value R1. Therefore, the data communication performed after the completion of the enumeration is not affected.

Note that in the communication system 500 according to this embodiment, for example, the USB host 510 and the USB device 530 check whether or not the device at the other end supports the technique according to the present invention through the Get Descriptor request (S108, S110 and S120 in FIG. 6) and its response (S208 and S210 in FIG. 7). This check may be performed through the Get Descriptor-Device (S104 in FIG. 6) and its response (S204 in FIG. 7).

Further, the above-mentioned check does not need to be performed in the known step of the USB communication system such as Get Descriptor-Device and its response and Get Descriptor request and its response. For example, the above-described checking step may be incorporated as an independent step separately from the known step in any given stage of the enumeration so that the USB host and the USB device perform the above-described check in that step.

Sixth Embodiment

Figure 9:
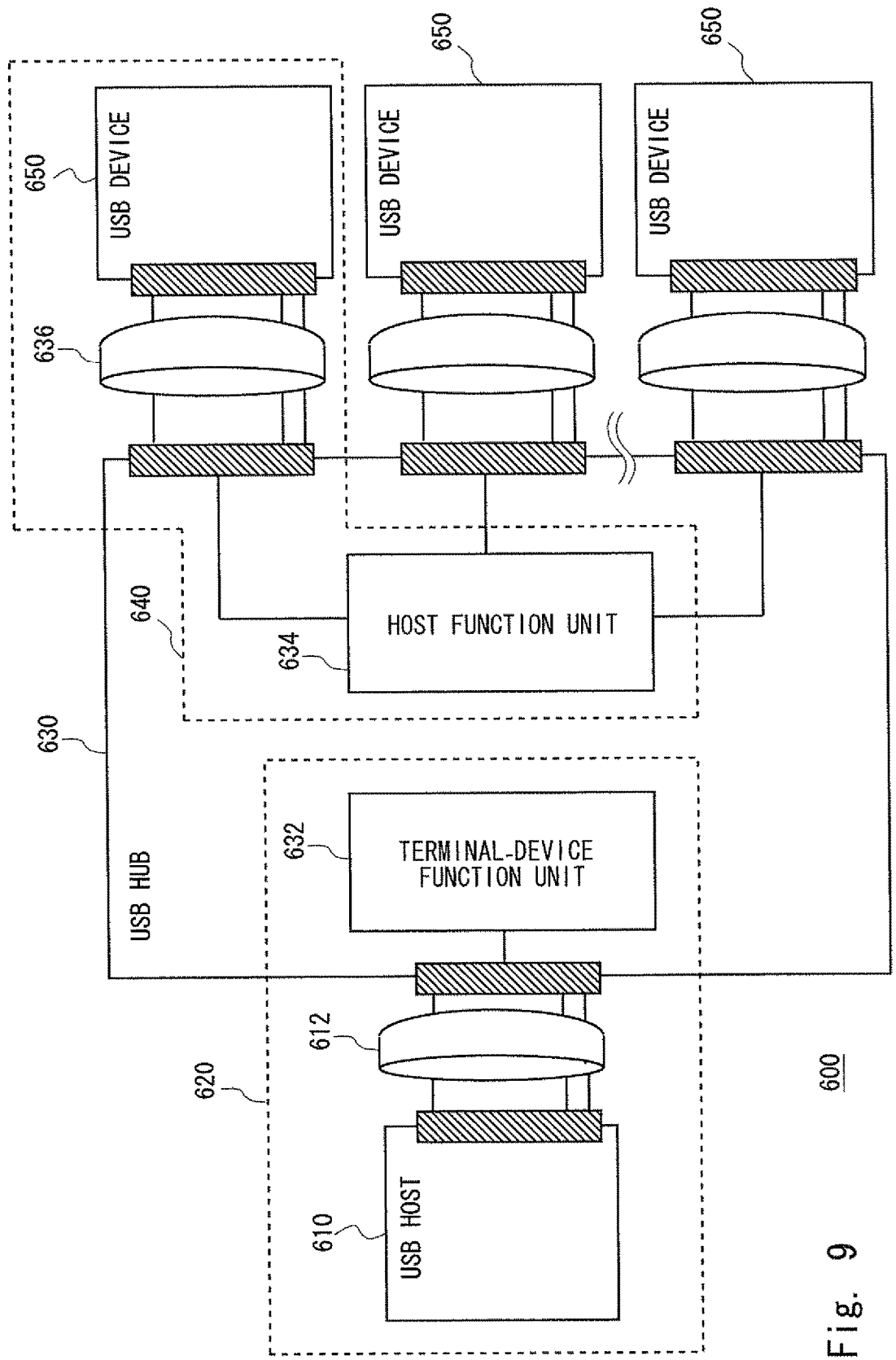
FIG. 9 shows a communication system according to a sixth embodiment of the present invention.
Figure 10:
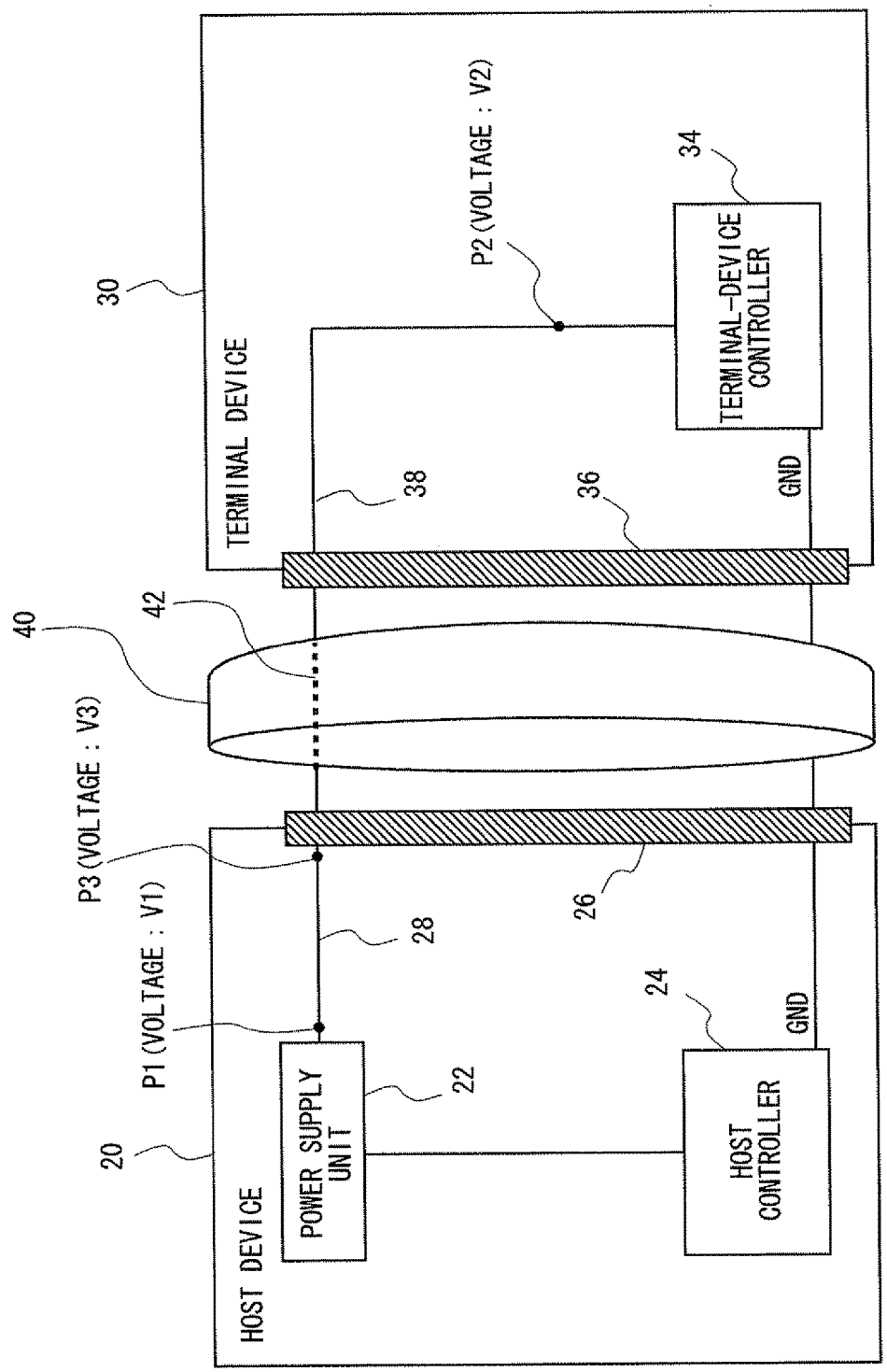
FIG. 10 shows an example of a USB system.

FIG. 9 shows a communication system 600 according to a sixth embodiment of the present invention. The communication system 600 includes a USB host 610, a USB hub 630, and a plurality of USB devices 650. One of the plurality of USB devices 650 is explained as a representative USB device.

The USB hub 630 is connected to the USB host 610 through a USB cable 612, and includes a terminal device function unit 632 that functions as a terminal device of the USB host 610, and a host function unit 634 that is connected to the USB device 650 through, a USB cable 636 and functions as a host device of the USB device 650. Note that the explanation and the illustration of the function of relaying communication between the USB host 610 and the USB device 650, which is usually provided in the USB hub 630, are omitted.

The USB host 610 and the terminal device function unit 632 of the USB hub 630 constitute a system block 620. The host function unit 634 of the USB hub 630 and the USB device 650 constitute a system block 640.

The system block 620 performs a similar operation to that of the communication system 500. That is, by replacing the USB host 510 and the USB device 530 of the communication system 500 with the USB host 610 and the terminal device function unit 632 respectively, the above explanation of the communication system 500 can be applied to the system block 620.

Similarly, as for the system block 640, by replacing the USB host 510 and the USB device 530 of the communication system 500 with the host function unit 634 and the USB device 650 respectively, the above explanation of the communication system 500 can be applied to the system block 640.

That is, in the communication system 600 according to this embodiment, the USB host 610 can reliably supply a power supply voltage within a range in which the USB hub 630 can operate properly to the USB hub 630, and the USB hub 630 can reliably supply a power supply voltage within a range in which the USB device 650 can operate properly to the USB device 650

While the invention has been described in terms of several embodiments, those skilled in the art will recognize that the invention can be practiced with various modifications within the spirit and scope of the appended claims and the invention is not limited to the examples described above.

Further, these embodiments can be combined as desirable by one of ordinary skill in the art.

Further, the scope of the claims is not limited by the embodiments described above.

Furthermore, it is noted that, Applicant's intent is to encompass equivalents of all claim elements, even if amended later during prosecution.

What is claimed is:

1. A host device that supplies electric power to a terminal device, comprising:
   a host-side connector;
   a power supply unit configured to output a first voltage;
   a host-side power supply line connecting the power supply unit to the host-side connector;
   a first current measurement unit configured to measure a first current flowing through the host-side power supply line; and
   a host-side control unit configured to:
      receive, from the terminal device, a terminal-device-side notification value including a value of a second voltage at a reference point on a terminal-device-side power supply line or a value that enables the second voltage to be calculated, calculate a first resistance value indicating a resistance from the power supply unit to the reference point on the terminal-device-side power supply line based on the terminal-device-side notification value, a value of the first voltage and a value of the first current, and output the calculated first resistance value to the power supply unit, wherein, when the second voltage is outside of a predetermined first reference range associated with the reference point on the terminal-device-side power supply line, the power supply unit is further configured to adjust the first voltage according to the first resistance value supplied from the host-side control unit and the first current value measured by the first current measurement unit such that the second voltage changes to a value within the predetermined first reference range, wherein when the second voltage is greater than the predetermined first reference range, the power supply unit is configured to reduce the first voltage such that the second voltage decreases to a value within the predetermined first reference range, and when the second voltage is less than the predetermined first reference range, the power supply unit is configured to increase the first voltage such that the second voltage increases to a value within the predetermined first reference range.

2. The host device according to claim 1, wherein the host device conforms to USB (Universal Serial Bus) standards.

3. The host device according to claim 2, wherein
a third voltage is a voltage at an end of the host-side connector, and
the power supply unit adjusts the first voltage such that the third voltage remains within a second reference range according to the USB standards.

4. The host device according to claim 2, wherein a process, which is performed before the terminal-device-side notification value is received from the terminal device, is performed during enumeration with the terminal device.

5. A terminal device, comprising:
a terminal-device-side connector;
a terminal-device-side power supply line, for supplying electric power into the terminal device, connected to the terminal-device-side connector;
a measurement unit, connected to a reference point on the terminal-device-side power supply line, configured to measure a second current flowing through a resistor, which is connected to the reference point and has a second resistance value; and
a terminal-device-side notification unit configured to:
 receive, from a host, a host-side notification value including a value of a first voltage and a value of a first current, the first voltage being a voltage output by a power supply unit of the host, the first current being a current flowing through a power supply line of the host,
 calculate a first resistance value, indicating a resistance from the host power supply unit to the reference point on the terminal-device-side power supply line, based on the host-side notification value, a value of the second current and the second resistance value, and
 transmit, to the host, a terminal-device-side notification value, which includes the first resistance value, to control the voltage output by the host power supply unit such that, when a second voltage at the reference point on the terminal-device-side power supply line is outside of a predetermined first reference range associated with the reference point on the terminal-device-side power supply line, the host power supply unit adjusts the first voltage such that the second voltage changes to a value within the predetermined first reference range, wherein when the second voltage is greater than the predetermined first reference range, the host power supply unit is controlled to reduce the first voltage such that the second voltage decreases to a value within the predetermined first reference range, and when the second voltage is less than the predetermined first reference range, the host power supply unit is controlled to increase the first voltage such that the second voltage increases to a value within the predetermined first reference range.

6. The terminal device according to claim 5, wherein
the terminal device has multiple modes, and
the terminal device further comprises a switch unit that connects the reference point with the measurement unit in only one of the multiple modes.

7. The terminal device according to claim 5, wherein the terminal device conforms to USB (Universal Serial Bus) standards.

8. The terminal device according to claim 5, wherein a process that is performed before the terminal-device-side notification value is transmitted by the terminal-device-side notification unit is performed during enumeration with the host device.

9. A communication system, comprising:
a host device; and
a terminal device connected to the host device by a cable to receive electric power from the host device,
wherein the host device comprises:
 a host-side connector connected to the cable;
 a power supply unit configured to output a first voltage;
 a host-side power supply line connecting the power supply unit to the host-side connector;
 a first current measurement unit configured to measure a first current flowing through the host-side power supply line, and a host-side control unit,
wherein the terminal device comprises:
 a terminal-device-side connector connected to the cable;
 a terminal-device-side power supply line, for supplying electric power into the terminal device, connected to the terminal-device-side connector;
 a measurement unit, connected to a reference point on the terminal-device-side power supply line, configured to measure a second voltage at the reference point, or a second current flowing through a resistor, which is connected to the reference point and has a second resistance value; and
 a terminal-device-side notification unit configured to transmit, to the host device, a terminal-device-side notification value including a value of the second voltage or a value of the second current and the second resistance value,
wherein the host-side control unit receives the terminal-device-side notification value from the terminal device, calculates a first resistance value indicating a resistance from the power supply unit to the reference point on the terminal-device-side power supply line based on the terminal-device-side notification value, a value of the first voltage, and a value of the first current measured by the first current measurement unit, and outputs the calculated first resistance value to the power supply unit, wherein, when the second voltage is outside of a predetermined first reference range associated with the reference point on the terminal-device-side power supply line, the power supply unit adjusts the first voltage according to the first resistance value supplied from the host-side control unit and the first current value measured by the first current measurement unit such that the second voltage changes to a value within the predetermined first reference range, wherein when the second voltage is greater than the predetermined first reference range, the power supply unit reduces the first voltage such that the second voltage decreases to a value within the predetermined first reference range, and when the second voltage is less than the predetermined first reference range, the power supply unit increases the first voltage such that the second voltage increases to a value within the predetermined first reference range.

10. The communication system according to claim 9, wherein the communication system has multiple modes, and the terminal device further comprises a switch unit that connects the reference point with the measurement unit in only one of the modes.

11. The communication system according to claim 9, wherein the communication system conforms to USB (Universal Serial Bus) standards.

12. The communication system according to claim 11, wherein a third voltage is a voltage at an end of the host-side connector, and the power supply unit adjusts the first voltage such that the third voltage remains within a second reference range according to the USB standards.

13. The communication system according to claim 11, wherein a process, which is performed before the terminal-device-side notification value is transmitted to the host device from the terminal device, is performed during enumeration between the host device and the terminal device.

* * * * *